though not shown in the drawings are lettering stating the words "on" and "off."

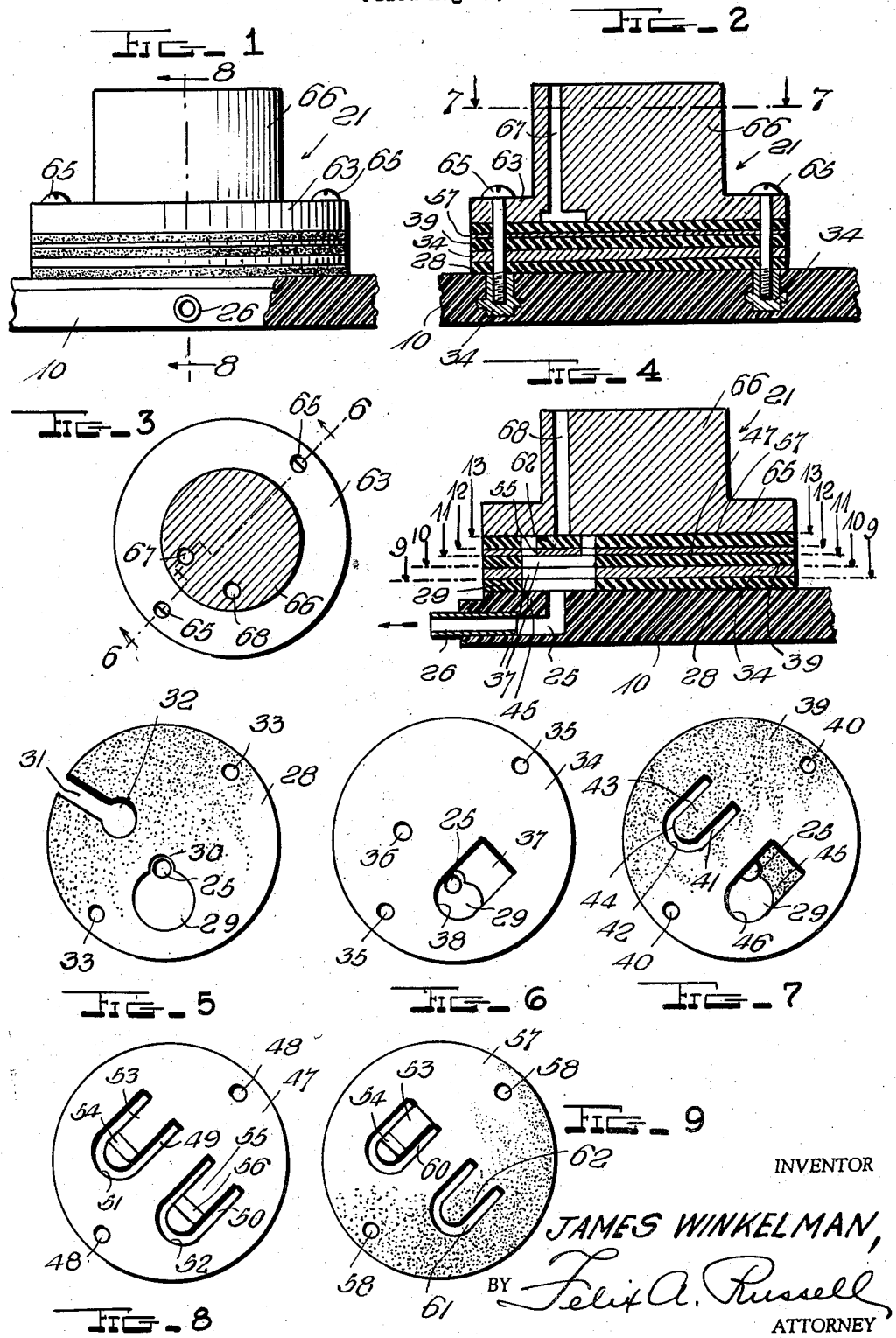

United States Patent Office 2,856,955
Patented Oct. 21, 1958

2,856,955

VALVE STRUCTURE FOR AERATORS OR THE LIKE

James Winkelman, Miami, Fla.

Application August 2, 1955, Serial No. 526,041

2 Claims. (Cl. 137—512)

The present invention relates to a valve structure for aerators or the like and it consists in the combinations, constructions and arrangements of parts herein described and claimed.

Generally the present invention constitutes an improvement over my former Patent No. 2,673,938, issued March 30, 1954. Primarily the invention relates to a valve structure which is compact and efficient and particularly adaptable for use with aerators and like devices. When used with a bellows, operated by an electromagnet or the like, the present valve structure provides a means whereby air may be substantially constantly delivered from the bellows to, for example, a tube leading to a bait tank. The valve structure is comparatively simple and formed of a minimum number of easily assembled parts.

It is accordingly an object of the invention to provide a novel valve structure of the character set forth.

Another object of the invention is to provide a valve structure of the character set forth which is simple in construction, inexpensive to manufacture and yet effective and efficient in use.

Still another object of the invention is to provide a valve structure of the character set forth formed of a number of easily assembled parts.

Still another object of the invention is to provide, in a device of the character set forth, a novel metal plate having formed therein a pair of novel spring members each adapted to maintain a rubber flap valve in normally closed position.

Other and further objects of the invention will become apparent from a reading of the following specification taken in conjunction with the drawings, in which:

Figure 1 is an enlarged fragmentary elevational view illustrating the valve structure forming the present invention, Figure 2 is a sectional view taken along line 6—6 of Figure 3, Figure 3 is a sectional view taken along line 7—7 of Figure 2, Figure 4 is a sectional view taken along line 8—8 of Figure 1, Figure 5 is a sectional view taken along line 9—9 of Figure 2, Figure 6 is a sectional view taken along line 10—10 of Figure 2, Figure 7 is a sectional view taken along line 11—11 of Figure 2, Figure 8 is a sectional view taken along line 12—12 of Figure 2, and Figure 9 is a sectional view taken along line 13—13 of Figure 2.

Referring now to the valve structure 21, it will be seen that the base 10 is provided with a downwardly and outwardly extending conduit 25 in the outer end of which is mounted a fitting 26 for the attachment of a hose 27 or the like.

A disc 28 of rubber or like material is provided with a circular opening 29 having a communicating off set opening 30. The disc 28 is also provided with a radial slot 31 having an enlarged communicating opening 32 at the inner end thereof. The disc 28 is likewise provided with a pair of diametrically opposed apertures 33. The disc 28 is mounted atop the base 10 in such manner that the extended opening 30 lies directly over the conduit 25 and the apertures 33 overlie apertured anchor plates 34 which are embedded in the base 10.

Superposed upon the disc 28 is a metallic disc 34 of identical diameter which is provided with a pair of diametrically opposed apertures 35 each of which overlies one of the apertures 33 in the disc 28. There is also provided in the disc 34 relatively small circular opening 36 which overlies the opening 32 in the disc 28. There is also provided in the disc 34 a relatively large opening 37 having a rounded end 38, the opening 37 overlying the openings 30 and 25.

Overlying the disc 34 is a disc 39 of rubber or the like and of identical diameter with the discs 28 and 34. The disc 39 is provided with a pair of diametrically opposed apertures 40 which overlie the apertures 35 in the disc 34. The disc 39 is provided with a relatively large opening 41 having a rounded end 42 and having a flap 43 extending from that end opposite the rounded end 42, it being apparent that the flap 43 is likewise rounded at its free end, as indicated at 44. There is also provided a relatively large opening 45 which overlies the openings 25 and 29 and which is provided with a rounded edge 46.

Atop the disc 39 there is mounted a disc 47 of identical size with the previously mentioned discs which is formed of metal preferably of thin brass and provided with a pair of diametrically opposed apertures 48 which register with the openings 40 in the disc 39. A pair of relatively large openings 49 and 50 is provided in the disc 47 both of which have rounded ends, as indicated at 51 and 52, respectively. Within the opening 49 and integrally formed with that disc 47 at that end of the opening 49 opposite the rounded end 51 is a downwardly directed spring 53 having a rounded outer end and a dependent transverse ridge 54 formed therein adjacent such outer end. A like spring 55 having an upstanding ridge 56 is provided in the opening 50.

It will be seen that the openings 49 and 50 overlie, respectively, the openings 41 and 45 in the disc 39.

A disc 57 of rubber or like material and having the same diameter as the previously mentioned discs overlies the disc 47 and is provided with a pair of diametrically opposed apertures 58 which each overlie one of the apertures 48 in the disc 47. The disc 57 is provided with a relatively large opening 60 which exactly overlies the opening 49 in the disc 47 and is also provided with an opening 61 which exactly overlies the opening 45 in the disc 39. A flap 62 having a rounded free end, extends into the opening 61 and is adapted to overlie the spring 55.

Superposed upon the disc 57 is a metallic cap 63 which is identical in diameter with the various discs above described. The cap 63 is provided with a pair of diametrically opposed apertures 64 which register with the apertures 58 in the disc 57 and, of course, with the apertures 33, 35, 40 and 48 in the remaining discs. Screws 65 extend through the thus arranged apertures and engage in the members 34, as clearly shown in Figure 2.

Concentrically and integrally formed with the cap 63 is a projection 66 which is provided with a vertical opening 67 which likewise extends through the cap 63 to register with various openings and the like in the various discs 28, 34, 39, 47 and 57. A vertical opening 68 extends through the cap 63 and projection 66 and likewise registers with certain openings in the various discs above described. The underside of the cap 63 is provided with a shallow opening 69 into which leads the opening 67 and the shallow opening 69 registers with the opening 60 in the disc 57. A top member 70 for the bellows 20 is affixed to the lower end of the pin 22 and it will be apparent that the bellows 20 is generally cylindrical and has its lower end fixed over the projection 66 in frictional contact therewith and its upper end secured to the sides of the member 70 by means of a cord 71 or the like.

In operation, it will be apparent that the valve structure 21 is designed to permit an ingress of air into a bellows when the same is expanded and to permit an egress of air through the fitting 26 and tube 27 when the bellows is compressed, such compression and expansion movements of the bellows being extremely rapid, of course, thus providing a practically steady flow of air through the tube 27.

The operation of the valve structure in accomplishing the work above referred to is as follows: upon the upstroke of the member 70, the bellows will be expanded thus drawing air through the radial passage 31 into the opening 32 where it will then pass upwardly through the opening 36 lifting the flap valve 43 against the action of the spring 53 which bears thereagainst and thence through the opening 60 into the vertical passageway 67 where it will enter the bellows. Upon the downstroke of the pin 22, it will be apparent that the bellows will be compressed at which time the flap 43 will tend to maintain the opening 36 in a closed condition. Hence, air will now pass downwardly through the opening 68 to open the flap valve 62 at the bottom thereof against the action of the spring 55 thus allowing the air to continue downwardly through the opening 45, the opening 29 into the passageway 25 and thence through the fitting 26 into the tube 27. As aforestated, the upward and downward movement of the pin 22 and its associated parts will cause, for all practical purposes, a steady flow of air through the tube 27.

While but one form of the invention has been shown and described herein, it will be readily apparent to those skilled in the art that many minor modifications may be made without departing from the spirit of the invention or the scope of the appended claims.

What is claimed is:

1. A valve structure for aerators comprising a first disc of flexible material having a downwardly directed first opening and an upwardly directed second opening therein, a radially extending passage in said first disc, a second metallic disc superposed upon said first disc and having an upwardly directed opening registering with the second opening in said first disc and a relatively large opening registering with the first opening in said first disc, a third disc of flexible material superposed upon said second disc and having two relatively large openings each registering with an opening in said second disc, a flap valve affixed to one end of an opening in said third disc and adapted to cover the second opening in said second disc, a fourth disc of relatively thin metal having a pair of relatively large openings therein each registering with one of the openings in said third disc, an upwardly biased spring affixed to one side of the other opening in said fourth disc, a fifth disc of resilient material having a pair of relatively large openings therein each registering with an opening in said fourth disc, a flap valve affixed to one side of one of the openings in said fifth disc, said upwardly biased spring bearing against the underside of said valve in said fifth disc, a circular cap superposed upon said fifth disc and having a shallow opening in the lower face thereof to receive the valve of said fifth disc therein, and a concentric upwardly extending projection formed on said cap, said cap and projection having a pair of vertical passages each registering with one of the openings in said fifth disc.

2. A device as defined in claim 1 wherein each of said discs and said cap is provided with a pair of diametrically opposed vertically registering openings, and wherein mounting screws extend through said registering openings.

References Cited in the file of this patent

UNITED STATES PATENTS

| | | |
|---|---|---|
| 2,228,565 | Haddaway | Jan. 14, 1941 |
| 2,334,525 | Zadig | Nov. 16, 1943 |
| 2,471,796 | Thiberg | May 31, 1949 |
| 2,673,938 | Winkelman | Mar. 30, 1954 |
| 2,707,074 | Tussey | Apr. 26, 1955 |